United States Patent Office 3,293,394
Patented Dec. 20, 1966

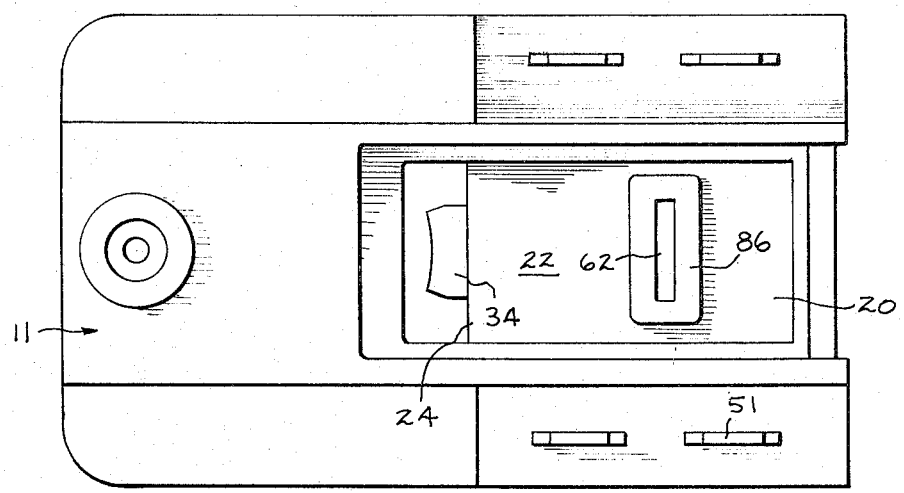
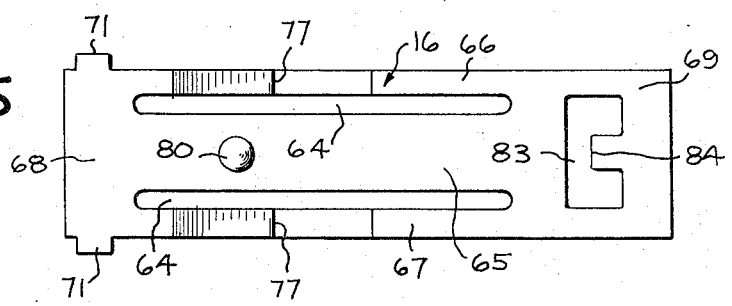
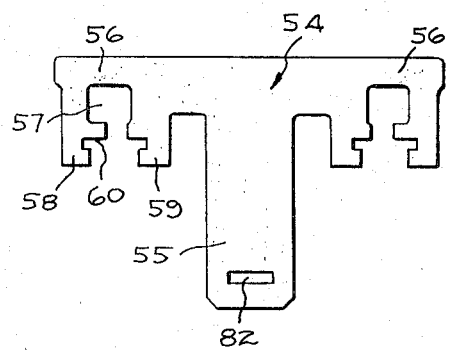

3,293,394
TEMPERATURE RESPONSIVE CONTROL DEVICE WITH SNAP ACTING SWITCH
Paul R. Staples, Louisville, Ky., assignor to General Electric Company, a corporation of New York
Filed July 23, 1965, Ser. No. 474,246
8 Claims. (Cl. 200—140)

The present invention relates to the construction and arrangement of a temperature responsive control device, and particularly to the housing construction and snap-action spring mechanism for operating the electrical switching mechanism of a thermostat for use in domestic ovens.

Hydraulic thermostats are available on the market having a temperature sensor in the form of an elongated bulb or probe formed at the end of a capilary tube that is joined at the other end to an expansible member which has a bellows or diaphragm within the thermostat housing. This general type of thermostat is disclosed in the Ettinger Patent No. 2,260,014 which is assigned to the General Electric Company, the assignee of the present invention. As engineers continue their search for simpler and more reliable temperature control devices, important and in the manufacturing techniques. In order to area and in the manufacturing techniques. In order to obtain an accurate control of temperature, it is necessary to provide calibrating means in the thermostat for adjusting both the position of the snap-action spring mechanism and the position of the expansible member relative to each other to the spring mechanism will be such as to create the necessary conditions for controlling the temperature experienced by the temperature sensor by cycling the contacts of the switch mechanism of the thermostat between ON and OFF positions.

A principal object of the present invention is to provide a temperature responsive control device with a combined blade and amplitude spring interposed between the expansible member and the electrical switch mechanism.

A further object of the present invention is to provide a temperature responsive control device with a simplified energy storage snap-acting mechanism interposed between the expansible member and the electrical switch mechanism.

A further object of the present invention is to provide an oven thermostat with an improved housing construction that isolates and insulates the electrical switch mechanism from the expansible member and the snap-acting spring mechanism.

A further object of the present invention is to provide an oven thermostat with an improved calibration means for simplified construction, assembly and operation as well as increased reliability.

A still further object of the present invention is to provide an oven thermostat with a housing that includes a recessed base member and novel cover means for closing the base and forming a hollow housing with protected electrical terminals.

The present invention, in accordance with one form thereof, is embodied in a hydraulic thermostat having a hollow housing with a manually adjustable expansible member mounted in one wall of the housing. The housing is divided into compartments where one compartment encloses an electrical switch mechanism, and another compartment accommodates the expansible member. Positioned between the expansible member and the switch mechanism is a snap-acting spring mechanism for cycling the switch according to the direction and extent of the temperature change experienced by the sensor of the thermostat. The spring mechanism comprises a combined blade and amplitude spring.

My invention will be better understood from the following description taken in conjunction with the accompanying drawing and its scope will be pointed out in the appended claims.

FIGURE 3 is a plan view of the bottom surface of the thermostat housing of FIGURE 2 with the cover removed;

FIGURE 4 is an elevational view of the insulating carrier member for the movable switch contacts;

FIGURE 5 is a top plan view of the combined blade and amplitude spring of the present invention;

Figure 1:
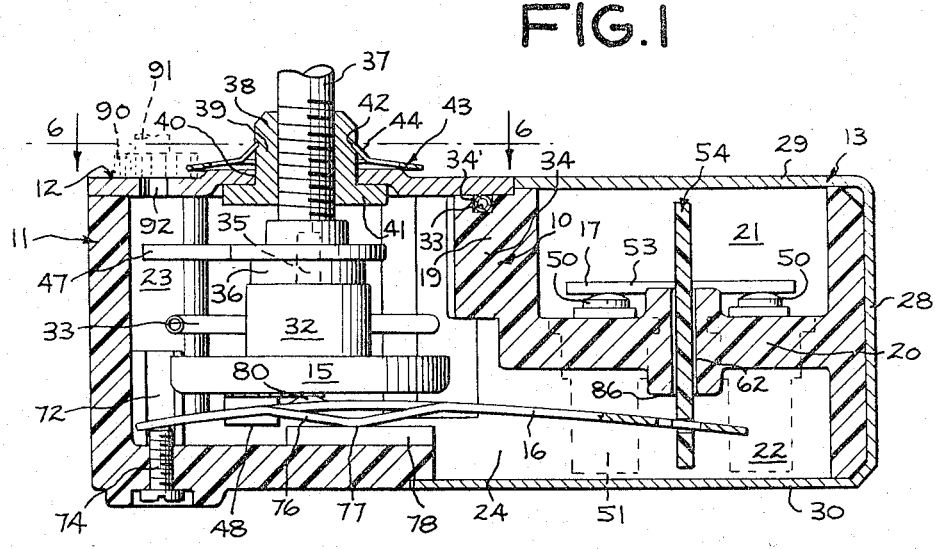
FIGURE 1 is a longitudinal cross-sectional elevational view on an enlarged scale taken through the center of the housing of an oven thermostat embodying the present invention.

Referring in detail to the drawing and in particular to FIGURE 1, 10 represents the hollow housing of an oven thermostat comprising a recessed base 11 and a two-piece cover means 12 and 13 respectively for closing the base. A thermostat or temperature responsive control device comprises three main elements in addition to the housing 10; namely, an expansible member 15, a snap-acting spring mechanism 16 and an electrical switch mechanism 17. Before entering into the details of these three main elements, the nature of the housing 10 will be described because it represents a substantial departure from thermostat housing designs of the prior art.

Figure 2:
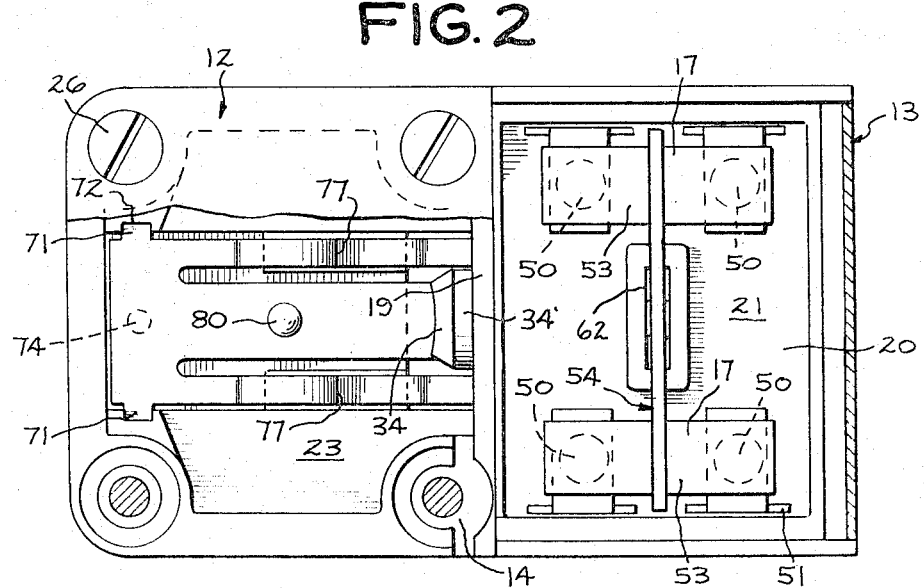
FIGURE 2 is a plan view of the thermostat of FIGURE 1 with parts of the cover broken away and the expansible member removed to show the nature of both the combined blade and amplitude spring as well as the electrical switch mechanism.

The recessed base 11 of the housing 10 is a box-like member of molded plastic such as a phenolic resin or the like insulating material, while the two cover means 12 and 13 are sheet metal parts. The shape of the base 11 is generally rectangular in plan view as is best seen in FIGURE 2. The base is divided into two substantially equal sections by a transverse partition 19. The first section at the right side of the partition 19 in FIGURE 2 is adapted to receive the switch mechanism 17, while the second section at the left side of FIGURE 2 accommodates the expansible member 15, as is best seen in the assembly view of FIGURE 1. Moreover, the first section is divided into a first upper compartment 21 and a second lower compartment 22. It is this first compartment 21 which encompasses the switch mechanism 17 and isolates these electrical parts from the remainder of the thermostat interior. Accordingly, the second section of the base for receiving the expansible member 15 may be considered as a third compartment 23. An opening 24 is formed in the transverse partition 19 in the area between the second compartment 22 and the third compartment 23 for receiving a portion of the spring mechanism 16 therethrough, as is best seen in FIGURE 1.

The third compartment 23 of the base 11 is open at the top. The cover plate 12 is of generally square shape and is adapted to close the third compartment 23 by being fastened over the top opening thereof and held in place by the countersunk fastening screws 26 located in the four corners thereof. The first compartment 21 is also open at the top, while the second compartment 22 is open only at the bottom. The second cover means 13 is designed to close both of the first and second compartments 21 and 22 respectively. Thus, the second cover means 13 is of generally U-shape in side view which snaps into place over the top, side and bottom of the first section of the base 11. This cover means 13 has a top horizontal arm 29, a vertical bight portion 28 and a horizontal bottom arm 30. The two arms 29 and 30 of the cover 13 are slightly converging so that they must be sprung apart slightly in order to force them over the right side of the base 11. Once they reach the closed position shown in FIGURE 1, they are firmly held in place and cannot easily be dislodged.

Having described above the housing 10, attention will now be given to the expansible member 15. It is a hydraulic-filled bellows or diaphragm assembly 32 that converts volumetric expansion or contraction into rectilinear motion acting upon the spring mechanism. Into the side of the diaphragm assembly is connected a capillary tube 33 of, for example, two feet in length. This tube is adapted to extend out of the base 11 so that its free end may be positioned within the area whose temperature is to be controlled, such as a baking oven. Provided on the free end of the tube would be a temperature sensing bulb or probe (not shown) as is conventional in this art. As is best seen in FIGURE 1, the transverse partition 19 is provided with a side extension 34 in the third compartment 23. This extension 34 has a top surface with an undercut seat 34' for receiving the capillary tube 33. From this seat 34' the capillary tube 34 extends out through an aligned slot 14 in the side of the base as is shown in FIGURE 2.

It is necessary to be able to adjust the position of the expansible member 15 toward and away from the spring mechanism 16 for setting various desired temperature levels. The top of the diaphragm assembly or reservoir 32 is provided with a vertical pin 35 (shown in dotted lines in FIGURE 1) which is freely received within a mating hole in a collar 36 that is fastened on the lower end of a threaded adjustment shaft 37. The shaft extends through the cover plate 12 and is held therein by a threaded bushing 38. This bushing has a barrel 39 which is adapted to fit through a close fitting opening 40 in the cover plate 12. A shoulder 41 is formed on the lower end of the barrel 39 for engagement against the underside of the cover plate. An annular groove 42 is cut in the outer surface of the barrel 39 so that a speed nut or retaining member 43 may be slipped first over the shaft and then forced over the barrel 39 of the bushing until its radial spring fingers 44 engage within the annular groove 42 to hold the bushing in the cover 12 in a firm manner. Formed as part of the collar 36 is a radial finger member 47 which cooperates with the side extension 34 of the transverse partition 19 and serves as a stop means to limit the angle of rotation of the shaft 37 to something slightly less than 360°.

Figure 6:
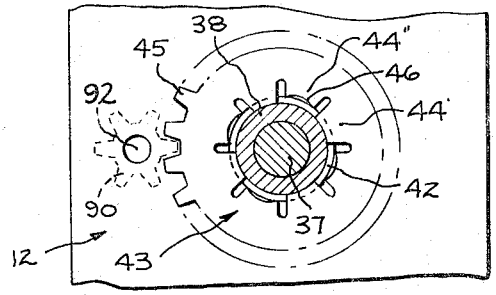
FIGURE 6 is a fragmentary view taken on the line 6—6 of FIGURE 1 showing the calibrating means of the shaft of the expansible member.

As is shown in the plan view of FIGURE 6, the speed nut 43 is an annular member having the inwardly facing radial spring fingers 44 and a spur gear tooth profile 45 around the outer periphery. The spring fingers 44 are of alternate designs. One set of fingers 44' have their free ends seated in the groove 42, while a second set of shorter fingers 44" each have a V-notched free end 46 forming locking points that dig into the side of bushing 38 and prevent relative rotational movement between the bushing and speed nut.

The gear tooth profile 45 of the speed nut is adapted to mesh with a pinion gear or turnkey 90 which has a pilot shaft 91 that is to be inserted in the shaft seat 92 in the cover 12 as is best seen in FIGURE 1. Thus an appliance serviceman might recalibrate this thermostat in the customer's home by changing the rotational position of the bushing after determining that the temperature within the oven does not correspond with the preset temperature of the thermostat dial. This may be done by holding the threaded shaft 37 stationary and using the pinion gear 90 to turn the speed nut 43 and hence the bushing 38. Thus the collar 36 of shaft 37 can be positioned inward or outward by the proper turning of the speed nut 43, thus re-establishing a snap-action operating point with respect to the legends on the thermostat temperature indicating scale.

The diaphragm 15 is prevented from turning when the shaft 37 is turned by an inverted U-shaped clip 48 that has its base integral with the diaphragm and overlies the overcenter spring blade 16 as is best seen in FIGURE 1.

Turning back to a consideration of the first compartment 21 of the base 11 and the electrical switch mechanism 17 assembled therein, there are four switch contacts 50 fixed on the top surface of the horizontal partition 20. These four contacts are arranged in a transverse rectangular pattern as is best seen in FIGURE 2, there being a pair of switch contacts located at each side of the first compartment 21. This switch mechanism 17 is a double pole, single throw switch for breaking both sides of the line of a power supply circuit as for example the heating elements (not shown) of an electric oven. Each contact 50 is provided with a perpendicular terminal blade 51 that is adapted to extend down through a suitable slot in the horizontal partition 20 and form a quick-connect terminal means for the contact. As is best seen in FIGURE 3, the second compartment 22 of the base 11 is of narrow width so that the free ends of the contact terminal blades 51 actually extend to the exterior of the base and to the sides of the second compartment. Then looking at FIGURE 1, the terminals 51 do not extend below the bottom wall of the base 11. This allows this thermostat to be used in a small wiring space.

In addition to the fixed contacts 50, the switch mechanism 17 includes a pair of movable contacts 53, 53 which are joined together and motivated by an insulating carrier member 54, as is shown in FIGURE 4 as being of generally T-shape having a vertical shank 55 and overhanging side arms 56. Each side arm is provided with a cut-out portion 57 in its underside which creates two spring fingers 58 and 59. The side of each finger is provided with a guide notch 60 for receiving one edge of the movable contact 53 therein. As is best seen in FIGURE 1, the horizontal partition 20 of the base 11 is provided with a central, vertical slot 62 for receiving the shank 55 of the carrier member 54 therethrough so that a connection may be made with the spring mechanism 16 as will be better understood hereinafter.

Now that the expansible member 15 and the electrical switch mechanism 17 have been described, it is necessary to interpose a snap-acting spring mechanism which is acted upon by the movement of the expansible member for varying the position of the switch mechanism according to the direction and extent of the temperature change experienced by the temperature sensor or bulb on the end of the capillary tube. The spring mechanism is in the form of a combined blade and amplitude spring 16 as is best seen in FIGURE 5. It is of generally elongated rectangular configuration in plan view, and it is made of thin sheet, spring stock such as beryllium copper or the like. This blade is provided with a pair of longitudinal slots 64, 64 which stop short of the ends of the blade so as to define three longitudinal strips; namely, a center strip 65 and two side strips 66 and 67. Looking at FIGURE 1, the blade 16 is formed upwardly to retain a natural upward bowed condition. The left end 68 may be called the supported end of the blade, while the right end 69 may be considered as the free or bistable end of the blade. The blade should be restrained from moving in a horizontal plane and this is accomplished by interlocking the supported end 68 of the blade with the base 11. Looking at FIGURE 2, the blade end 68 is provided with a pair of oppositely directed ears 71 which are each adapted to fit snugly into a vertical slot 72 formed in the base as can be seen in FIGURE 1. Thus, the ears 71, 71 of the blade 16 are dropped into the vertical slots 72 after the free end 69 of the blade 16 is first lowered into the third compartment 23 and then inserted through the opening 24 in the transverse partition 19 and into the second compartment 22. For calibration purposes, a vertical adjusting screw 74 is threaded up through the bottom wall of the base 11 and is adapted to be in contact with the supported end 68 of the blade 16 at a point in an imaginary line connecting the supporting ears 71, 71 as is best seen in FIGURES 1 and 2.

At this early stage in the description, the combined blade and amplitude spring 16 is unstable in that it is supported at only one point; namely, on the calibration screw 74. In addition the two side strips 66 and 67 of the blade have portions folded downwardly to form a V-section 76 as is best seen in FIGURE 1 to provide a dull knife-edge 77 for bearing upon a support pad 78 of the bottom wall of the base 11. Each V-section 76 is opposite the other as is best seen in FIGURE 2 so that the knife edges 77, 77 are located in an imaginary transverse line with each other. Thus, the blade 16 is provided with a three point support system; namely, the calibration screw 74 at the supported end 68 of the blade and the two knife edges 77 at the two side strips 66 and 67 of the blade.

The expansible member 15 is adapted to bear against the center strip 65. In order to obtain accurate results, this bearing point is prevented from changing by creating a small raised embossment 80 on the center strip for engagement by the expansible member 15. Notice that this bearing point 80 is within the area defined by the three point support system of the calibration screw 74 and the knife edges 77, 77.

Now it is necessary to connect the free end 69 of the blade with the carrier member 54 of the switch mechanism 17. The lower end of the carrier 54 is provided with a small notch 82 as it best seen in FIGURE 4. Looking at FIGURE 5, the free end 69 of the blade is provided with a C-shaped slot 83 which creates a tongue member 84 that is adapted to slip into the notch 82 of the shank 55 of the carrier 54 as is best seen in the assembly view of FIGURE 1 of the drawing. Attention is called to the fact that when the thermostat is in its normal position, the blade 16 is bowed upwardly in such a way so to hold the carrier down tightly in a normally closed switch position. Thus, when the temperature experienced by the temperature sensor rises, and the heat generation is to be discontinued, the fluid in the expansible member 15 will expand thereby applying an increased downward force on the bearing point 80 of the blade 16 and this tends to flex the free end 69 of the blade in an upward direction tending to lift the movable contacts 53 off the fixed contacts 50 and thereby opening the power circuit to the heating elements. The blade moves upwardly until it bears against the bottom of a boss 86 which surrounds the slot 62 through the horizontal partition 20 of the base 11.

Having described above my invention of a novel thermostat, it will readily be apparent to those skilled in this art that in the normal closed switch position of FIGURE 1 the combined blade and amplitude spring 16 is supported at four points. These four points of support include the calibration screw 74, the two dull knife edges 77, 77 and lastly the bottom edge of the notch 82 in the bottom of the shank 55 of the movable contact carrier 54. This four point support action occurs when the center strip 65 is curved in its normal convex upwardly configuration. As the thermostat fluid temperature and pressure increases there is an increased downward force exerted on the center strip 65 by the diaphragm. As the downward force increases the curvature as well as the compressive stresses of the center strip 65 increases until the center strip buckles. This buckling very rapidly reverses the downward force exerted by the tongue member 84 against the bottom edge of the notch 82 in the shank 55 to an upward force of the tongue against the top edge of the notch 82. The boss 86 serves as a stop means for the free end 69 of the blade. The center strip, however, continues to buckle and this energy is transferred as a bending energy to the two side strips 66 and 67. This transferred energy is stored in the side strips 66 and 67 and it opposes the further buckling of the center strip.

When the reverse action takes place and the diaphragm 15 contracts and relaxes the downward compressive force on the center strip, a deflection point is reached where stored energy in the two side strips. Hence, a very rapid the decrease of the compressive force is overcome by the downward motion results and the electrical contacts 50 are bridged by the movable contacts 53, 53.

Modifications of this invention will occur to those skilled in this art, therefore it is to be understood that this invention is not limited to the particular embodiments disclosed, but that it is intended to cover all modifications which are within the true spirit and scope of this invention as claimed.

What I claim as new and desire to secure by Letters Patent of the United States is:

1. A hydraulic thermostat comprising a housing that includes an expansible member cooperating with a snap-acting spring mechanism of an electrical switching means, said expansible member being adapted to be connected by a fluid-filled capillary tube to a remote temperature sensor, and a shaft mounting means extending through one wall of the housing for supporting the expansible member therefrom, said expansible member being adapted to expand and contract according to the direction and extent of the temperature change experienced by the temperature sensor, the said snap-acting spring mechanism comprising a slotted spring blade to form three longitudinal strips, the two side strips being formed downwardly at opposite points to establish bearing points and shorten the effective lengths of the side strips so as to apply a compressive force on the center strip, the spring blade having retaining members at one end mating with cooperating portions of the housing so as to allow for vertical movement therebetween while preventing horizontal displacement, and the point of an adjustable supporting screw means located beneath the retained end of the spring blade, the spring blade having a three point support arrangement formed by the said screw means and the pair of bearing points of the blade resting on the housing, the expansible member bearing on the center strip at a point within the three point support arrangement, and an electrical switching means including fixed contact means and movable contact means for making and breaking an electrical circuit, and connector means between the end of the spring blade opposite the retained end and the movable switch contacts, the housing including supporting and guiding means for the said connector means.

2. A hydraulic thermostat comprising a housing enclosing an expansible member, a snap-acting spring mechanism, and an electrical switching means, the expansible member bearing against the spring mechanism, and the spring mechanism being joined to the switching mechanism for making and breaking an electrical circuit as a function of the expansion and contraction of the expansible member according to the direction and extent of temperature change of a remote body, the said spring mechanism including a spring blade that is double slotted to form three longitudinal strips, one end of the blade having a horizontal pivot means connected with the housing where the pivot means is capable of vertical adjustment, and an adjustable calibration screw located in one wall of the housing generally beneath the axis of the pivot means, the two side strips of the blade each being formed with a V-section that is opposite each other to form a point of bearing at the apex of the V and provide a three point support means for the blade, the bearing of the expansible member against the spring blade being against the center strip and within the boundaries of the three point support, the other end of the spring being connected to the switching mechanism as the motive force thereof.

3. A hydraulic thermostat as recited in claim 2 wherein the pivoted end of the spring blade has an ear extending outwardly from each side thereof, the housing having a vertical slot for each ear, whereby the ear is confined in the slot except for vertical adjustment.

4. A hydraulic thermostat as recited in claim 2 wherein each side of the pivoted end of the spring blade has a pair of inter-engaging parts formed by the cooperation of the housing and the blade to prevent horizontal displacement therebetween.

5. In a hydraulic thermostat having a hollow housing comprising a base member and cover means, the base member having a transverse partition dividing the base into two sections, the first section having an open top and bottom walls, a horizontal partition in the first section to divide this section into a first and a second compartment, the second section of the base being open at the top and comprising a third compartment, said cover means serving with the base member to close the three compartments, an electrical switch mechanism located in the first compartment, an opening in the transverse partition between the second and third compartments, a snap-acting spring blade seated in the third compartment and extending through the partition opening into the second compartment, an opening in the horizontal partition, an insulating connector located in the last-mentioned opening and joined at one end to the spring blade and at the other end to the said switch mechanism, and a hydraulic-filled expansion member adjustably supported from the cover means and located within the third compartment and in engagement with the spring blade.

6. In a hydraulic thermostat as recited in claim 5 wherein the snap-acting spring blade is doubled slotted to form three longitudinal strips, the portion of the blade within the third compartment having a one point support at its end, and its two side strips each having side by side bearings with the base member so as to provide a three point support system for the blade within the third compartment, the said expansion member bearing upon the center strip within the confines of the three point support system.

7. A temperature responsive control device comprising a housing, an expansible member adjustably mounted through one wall of the housing, said member expanding and contracting according to the direction and extent of temperature change of an external body, and manual control means combined with the expansible member for setting the desired temperature of the device, the housing having a transverse partition to divide the housing into two sections, the first section having a horizontal partition to divide the section into a first upper compartment and a second lower compartment, the second section of the housing comprising a third compartment that accommodates the said expansible member, an electrical switch mechanism located in the first compartment and comprising fixed switch contact means mounted on the horizontal partition and movable switch contact means, an opening formed in the transverse partition between the second and third compartments, a combined blade and amplitude spring seated in the third compartment and extending in cantilever fashion through the said opening into the second compartment, the expansible member being in engagement with the said spring, an opening formed in the horizontal partition, and an insulating connector located in the last-mentioned opening and joined at one end to the free end of the spring blade and at its other end to the movable switch contact means in a manner to hold the switch mechanism in a normally closed position.

8. A temperature responsive control device as recited in claim 7 wherein the spring blade has three longitudinal strips that are joined together at their ends, the blade being bowed upwardly to place the center strip in engagement with the expansible member, each of the side strips being formed with a depression to provide a pair of transversely aligned bearing surfaces engaging the housing, an adjustable calibration screw extending through a wall of the housing and into engagement with the underside of the blade to serve as a fulcrum, the housing including means for restraining the blade from sliding off of said fulcrum.

References Cited by the Examiner
UNITED STATES PATENTS

| | | | |
|---|---|---|---|
| 2,754,388 | 7/1956 | Beeman | 200—83 |
| 3,114,813 | 12/1963 | Curst | 200—140 |
| 3,121,338 | 2/1964 | Payne | 200—140 X |

References Cited by the Applicant
UNITED STATES PATENTS

| | | |
|---|---|---|
| 1,990,747 | 2/1935 | Netschert. |
| 2,044,822 | 6/1936 | Vaughn. |
| 2,729,720 | 1/1956 | Jacobs. |

BERNARD A. GILHEANY, *Primary Examiner.*

G. MAIER, *Assistant Examiner.*